UNITED STATES PATENT OFFICE.

GEORGE A. GOODRICH AND FLETCHER M. SPAIN, OF NEWTON, IOWA.

IMPROVEMENT IN ARTIFICIAL-STONE COMPOUNDS.

Specification forming part of Letters Patent No. 196,219, dated October 16, 1877; application filed August 27, 1877.

*To all whom it may concern:*

Be it known that we, GEO. A. GOODRICH and FLETCHER M. SPAIN, of Newton, in the county of Jasper and State of Iowa, have invented certain new and useful Improvements in Artificial Stone; and we do hereby declare the following to be a full, clear, and exact description of the invention, such as will enable others skilled in the art to which it pertains to make and use it.

Our invention relates to a process for making artificial stone; and it consists in the use of tar-water in mixing the cement and sand together, as will be more fully described hereinafter.

In making stone, we take one gallon, more or less, of fresh coal-tar, and thoroughly mix it with about twenty times as much water. This mixture is left standing for twenty-four hours, when the water is strained, so as to take out all the floating particles of tar. This tar-water is then used in mixing the cement and sand together.

In making stone we use either Portland or English cement and common river-sand, and vary their proportions according to the kind of stone we wish to make. For a fine quality of stone, we use more cement and less sand; for a poorer quality, we use more sand and less cement.

After mixing, the mixture is put into molds of any desired shape and pounded or pressed solid, and then, after it is taken from the molds, the stone is allowed to harden for three or four days, when it is ready for use.

By thus using tar-water, instead of tar itself, as has heretofore been the case, we not only are enabled to use a smaller quantity of the tar, but the mixture is more firmly impregnated with the tar, and we produce a harder, finer, and better quality of sandstone than where the tar itself is used.

Having thus described our invention, we claim—

In the process of making artificial stone, tar-water for the purpose of mixing sand and cement, or their equivalent substances, substantially as described.

In testimony that we claim the foregoing we have hereunto set our hands this 20th day of August, 1877.

GEO. A. GOODRICH.
    F. M. SPAIN.

Witnesses as to G. A. Goodrich:
 E. E. HUGHES,
 HUGH NEWELL.

Witnesses as to F. M. Spain:
 A. C. MERSHON,
 J. B. EGERLY.